United States Patent [19]

Belmares-Sarabia et al.

[11] Patent Number: 4,811,084
[45] Date of Patent: Mar. 7, 1989

[54] VIDEO COLOR DETECTOR AND CHROMA KEY DEVICE AND METHOD

[75] Inventors: Armand Belmares-Sarabia, Catskill, N.Y.; Stanley J. Chayka, Parsippany, N.J.

[73] Assignee: Corporate Communications Consultants, Inc., Fairfield, N.J.

[21] Appl. No.: 939,600

[22] Filed: Dec. 9, 1986

Related U.S. Application Data

[63] Continuation-in-part of Ser. No. 598,468, Apr. 9, 1984, Pat. No. 4,679,067, and Ser. No. 851,164, Apr. 14, 1986.

[51] Int. Cl.⁴ .............................................. H04N 9/535
[52] U.S. Cl. ......................................... 358/22; 358/28
[58] Field of Search ...................... 358/22, 28, 181, 38, 358/27, 29

[56] References Cited

U.S. PATENT DOCUMENTS

| | | |
|---|---|---|
| 3,560,638 | 2/1971 | Skrydstrup . |
| 3,959,813 | 5/1976 | Legler . |
| 4,007,487 | 2/1977 | Vlahos . |
| 4,051,520 | 9/1977 | Davidse et al. . |
| 4,096,523 | 6/1978 | Belmares-Sarabia et al. . |
| 4,109,278 | 8/1978 | Mendrala et al. . |
| 4,386,363 | 5/1983 | Morrison . |
| 4,394,680 | 2/1983 | Watanabe .............. 358/22 |
| 4,396,939 | 8/1983 | Kitihama ............... 358/22 |
| 4,409,611 | 10/1983 | Vlahos . |
| 4,500,919 | 2/1985 | Schreiber .............. 358/78 |
| 4,525,736 | 6/1985 | Korman ................ 358/28 |
| 4,533,938 | 8/1985 | Hurst ................... 358/27 |
| 4,589,013 | 5/1986 | Vlahos et al. . |
| 4,609,916 | 9/1986 | Bedos .................. 358/22 X |
| 4,621,280 | 11/1986 | Shinohara et al. ...... 358/22 |
| 4,625,231 | 11/1986 | Vlahos . |
| 4,630,101 | 12/1986 | Inaba et al. . |
| 4,667,221 | 9/1987 | Cawley et al. . |

*Primary Examiner*—James J. Groody
*Assistant Examiner*—Victor R. Kostak
*Attorney, Agent, or Firm*—Curtis, Morris & Safford

[57] ABSTRACT

The color detector circuit can be adjusted with essentially infinite variability to cause it to detect virtually any color in the visible spectrum, and to define a narrow passband or range of colors which the device will transmit. The device can be used to provide accurate color key signals with a variable passband in chroma key equipment. The device can be used to provide multiple chroma key signals for a single picture frame. A color correction system using the chroma key device also is shown.

43 Claims, 5 Drawing Sheets

VIDEO COLOR DETECTOR AND CHROMA KEY DEVICE AND METHOD

This application is a continuation-in-part of U.S. patent application Ser. No. 598,468, filed on Apr. 9, 1984, which has issued as U.S. Pat. No. 4,679,067, on July 7, 1987, and U.S. patent application Ser. No. 851,164 filed on Apr. 14, 1986. The disclosures of those applications hereby are incorporated herein by reference.

FIELD OF THE INVENTION

This invention relates to devices and methods for detecting the colors represented by video signals, and to devices and methods for selectively connecting an output circuit to a selected one of two or more video signal sources in response to the detection of signals representing a pre-determined color. The latter devices and methods are commonly referred to as "chroma key" devices and methods.

BACKGROUND OF THE INVENTION

Video color detectors have several different uses. The use of color detectors in color correction is described in the above-identified co-pending patent applications. The use of such detectors in chroma keying is described herein.

Chroma key devices and methods typically are used to insert images from one video source into the picture formed by signals from another source. Either of the sources can be any of a variety of different types, e.g., a television camera viewing a "live" scene; a telecine device producing video signals from motion picture film; a video tape player reproducing video signals recorded on magnetic tape or other media; etc.

Figures 8, 9:
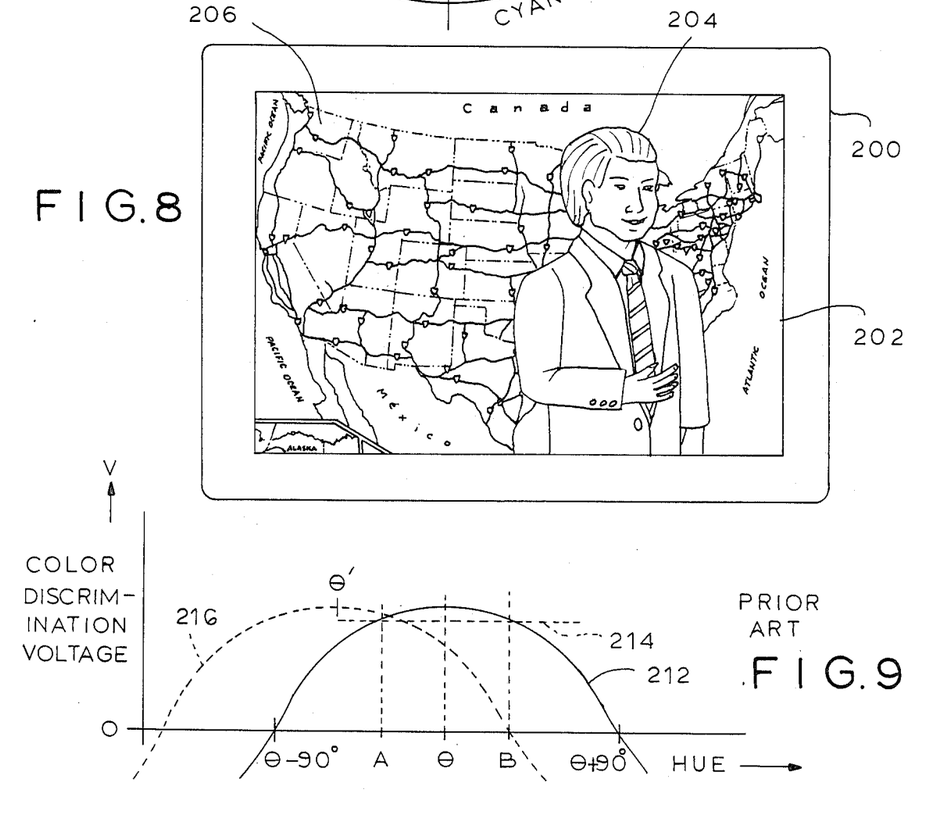
FIG. 8 is a drawing of a typical video picture of the type in which the invention is used.
FIG. 9 is a diagram illustrating the operational characteristics of a typical prior art device.

A typical use of a chroma key device during a live television broadcast is illustrated in FIG. 8 of the accompanying drawings, which shows a video monitor or receiver 200 which displays a video picture 202. A video camera (not shown) views a weather forecaster 204 standing in front of a large vertical blue surface called a "matte" which is not visible in FIG. 8. Instead, wherever the blue matte appears behind the forecaster 204, it has been replaced by the image of a weather map 206 showing the U.S. and parts of Canada and Mexico. The forecaster sees the weather map image on a studio monitor (also not shown in FIG. 8) and points to areas of the matte to indicate areas on the map. The weather map can have superimposed images, such as temperature data, etc.

Video signals forming the weather map are generated by a video source usually referred to as a "background source", and the image of the weather forecaster is generated by the studio camera, which usually is called a "foreground source".

The insertion of a weather map in place of the blue matte is made by a chroma key device which detects the foreground signals from the video camera. When, during each horizontal scan, signals representing the blue color of the matte are detected, the chroma key device switches the broadcast signal from the foreground source to the background source. Then, when the non-blue color of the forecaster is detected, the signals broadcast are switched to the foreground source, and then back again to the background source when the matte is detected again. This process is repeated for each horizontal line in the picture. Thus, the background signal replaces the blue matte everywhere except where the forecaster is located.

A major problem with prior chroma key devices is that they often provide false key signals by responding erroneously to colors other than the matte color. For example, the device often produces key signals upon the detection of not only the blue matte signals, but also the blue eyes or clothing of the announcer. This is very undesirable.

Sometimes the chroma key device will not respond to the matte color. Then the lighting in the television studio or the matte must be changed so that the apparent matte color is just right for the chroma key device. This can be very time-consuming and expensive.

Figure 7:
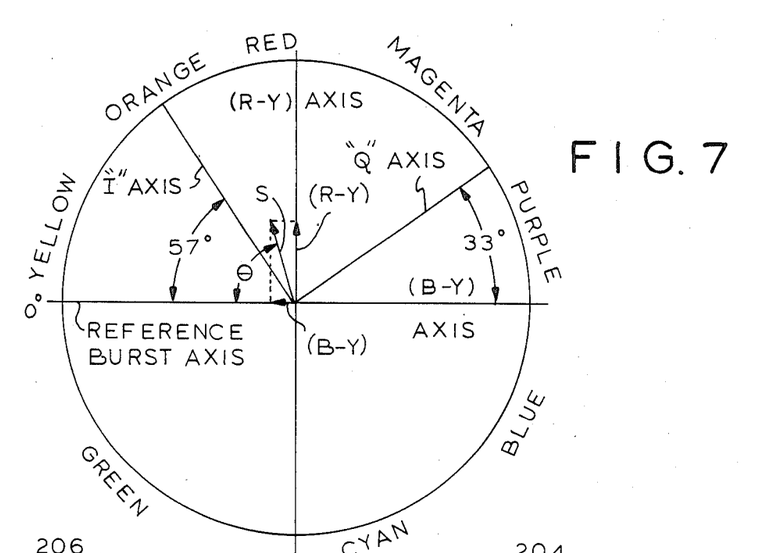
FIG. 7 is a vector diagram representing some of the variables in the operation of the device shown in FIG. 1.

Variation in the matte color to which the chroma key device will respond is provided in some prior art devices by means of a variable hue or color control in which the color or hue to which the keyer will respond can be varied throughout the entire spectrum of visible light. FIG. 7 of the accompanying drawings is a schematic vector representation of the hue and saturation of a given color video signal, as it is shown on the familiar "vectorscope" used in video production equipment. The angle "θ" of the vector represents the hue or color of the signals, and the length "S" of the vector represents the saturation or intensity of the signals. Although the hue or color control of such prior equipment theoretically makes it possible to select any hue as the matte color by, in effect, making it possible to rotate the vector in FIG. 7 through 360°, the keyer using this control actually responds to or "keys" on hues or colors far different from the desired matte color—at least when the colors are at anything less than high saturation levels. In other words, the device does not accurately discriminate among similar colors. This tends to cause false keying in response to other hues appearing elsewhere than in the matte area of the television picture.

The use of highly saturated or intense matte colors tends to somewhat alleviate the above problem, but places severe restraints on the colors usable in the studio, on lighting and other artistic variables, and on the variety of usable matte colors.

The use of prior chroma key devices also places undesirable restraint on the location of the weather reporter or announcer in relation to the matte. When using such prior devices, the announcer should be located at a relatively great distance from the matte so that blue matte color will not be reflected onto the announcer and cause false keying.

The use of bright or saturated blue as a matte color often causes "flare". Furthermore, the announcers usually must be smoothly coifed because the straggling hairs of a bouffant or other hair style with ragged edges sometimes will cause erroneous keying of the chroma key device.

Accordingly, it is an object of the invention to provide a video color detection device and method which are more accurate and flexible in use than in the past. It is a further object to provide a chroma key device and method which alleviate or solve the foregoing problems; a chroma key device and method in which the color to which the device responds can be controlled so as to prevent false switching or insufficient response to a desired color, and in which the color detection is more accurate and flexible than in the past.

It is another object of the invention to make it possible and practical to provide a plurality of different "keys" or insertions in a single television picture by switching among three or more video signal sources, one providing foreground and the others providing background signals for the multiple inserts.

It is a further object to provide a chroma key system and method capable of providing multiple keys in response to hues closely similar to one another.

An additional objective of the invention is to provide a color detection and chroma key device and method in which the degree of discrimination among hues can be adjusted so as to best adapt the operation of the device to the circumstances at hand.

Another object of the invention is to provide an improved hue detection device and method which is compatible with existing keying or switching devices having means for handling other chroma keying problems such as those caused by shadows, and the problem of providing either "soft" or "hard" edges for the key areas by providing either gradual or abrupt transition in switching between video sources, etc. Thus, it is an object to provide a chroma key device with excellent hue discrimination and other known chroma key features.

In accordance with the present invention, the foregoing objects ar satisfied by the provision of a color detection and chroma key devices and methods which are capable of discriminating among similar hues by limiting the band width of the hues and/or hue and saturation combinations which can be recognized by the device.

Preferably, this feature is provided in combination with a device which is capable of varying the center hue of the pass band in substantially infinitely small steps throughout the visible light spectrum. Thus, in essence, the vector representing the center of the pass band can be rotated through an angle of substantially 360° in the vector plane so that substantially any hue can be used for the matte. However, if a narrow band width is selected, the device will not key falsely upon detecting any hue except those the same as or very close to the center hue of the pass band.

Preferably, the band width of the color detector of the device can be varied by the operator. Thus, the device can be made to discriminate against all but a narrow range of hues, as described above, or it can be made to respond to a relatively wide range of hues, if this is best for the particular scene involved.

The invention not only makes it possible to use almost any hue as a matte color, and to minimize false keying by selecting a narrow pass band, but it also eliminates or reduces the need for the use of very intense or saturated matte colors. In fact, an optional feature of the device makes it possible to limit the video signals to be detected to those having saturation values below a predetermined level. By this means, if two areas having the same hue but different saturation levels are present in the same picture, the keyer will discriminate between the two areas and make the required insertion in the low-saturation area. For example, if a motion picture film frame has both a light blue sky in one area and an intense or saturated blue automobile of the same hue in a different area of the frame, the device will make the insertion in the blue sky area only.

Conversely, if preferred, another optional feature can be used to limit the signals detected to those having saturation values above a pre-determined level so that, in the foregoing example, the insertion would be made only in the area occupied by the intense blue automobile.

By making it possible to use matte colors of relatively low saturation, several of the problems mentioned above are solved or alleviated. For example, colors of low saturation will reduce the reflection problems, with the result that the foreground object (e.g., the announcer) can be located closer to the matte. "Flare" and problems due to ragged coiffures also are alleviated, improving the flexibility of casting, hairstyles, etc.

The ability of the invention to discriminate between closely similar hues, or between high and low saturation signals of the same hues, greatly enhances the versatility of the chroma keyer.

In accordance with another feature of the invention, a plurality of detectors can be used to provide simultaneously a plurality of inserts into a given scene or frame of a video or motion picture. Since each detector can be adjusted to detect signals having a very limited range of hues and/or saturation values, the tendency towards false keying which would be created by the use of two or more prior chroma key devices in a single frame would be substantially alleviated.

In one embodiment of the invention, the matte color detector uses the same circuitry as that used in the color connector described in the aforementioned U.S. patent application Ser. No. 851,164, and can be used either as a component of a chroma key device, or in discriminating among different objects or areas of a frame of a motion picture or video tape so that only the color of the desired object or area will be corrected. Thus, the detector circuitry can be used for multiple purposes in film-to-tape, tape-to-tape, or tape-to-film transfers. Actually, when the chroma keyer is used with film or tape, an additional advantage is realized in that the matte area itself less frequently requires color correction to enable it to actuate the keyer. This saves color correction labor and time.

Further advantages are obtained by the use of a device and method in which controls are provided for defining a limited area or "window" in a video picture and limiting the colors sampled by a chroma key device to those within the limited area. This has the effect of limiting the appearance of the background picture to only a portion of the matte area. Preferably, the limited area is variable in both position and size, and can be programmed to move gradually from one frame to the next in order to follow movement of an object in tape-to-tape or film-to-tape transfers. This feature is particularly advantageous when combined with the improved color detector of the invention.

The chroma keyer of the invention also can be incorporated advantageously into production studio switchers, or video tape or film editing equipment, or it can be supplied as a stand-alone device cabled to cameras or other studio equipment.

BRIEF DESCRIPTION OF THE DRAWINGS

The above and other objects, features, and advantages of the present invention will become apparent upon consideration of the following detailed description of the illustrative embodiments thereof, especially when taken in conjunction with the accompanying drawings, wherein.

GENERAL DESCRIPTION

Figure 1:
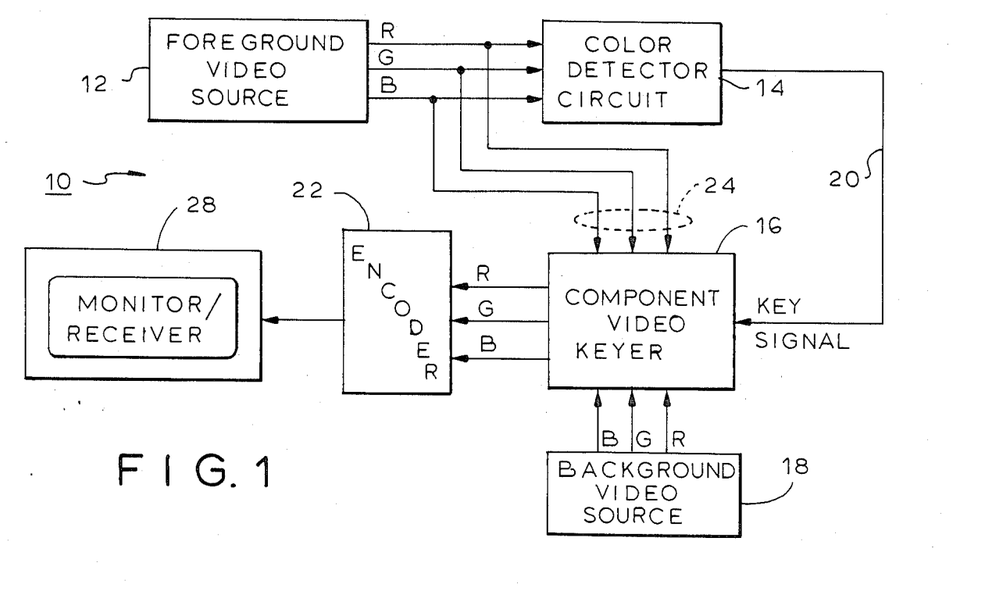
FIG. 1 is a schematic circuit diagram of the preferred embodiment of the invention.

FIG. 1 shows a chroma key system 10 constructed according to the invention. The system 10 includes a foreground video signal source 12, a color detector circuit 14, a keyer device 16, and a background video source 18. The color detector 14 is shown in greater detail in FIGS. 3, 4 and 6. The keyer 16 is shown in greater detail in FIG. 5.

In the preferred embodiment shown in FIG. 1, the output signals of the foreground video signal source 12 are in "component" form; that is, the signals are the red, green and blue components "R", "G", and "B" making up the video signal. The red green and blue signals are delivered to the detector 14 and the keyer 16 over lines 24. The background video signal source 18 delivers the red, green and blue signals to the keyer 16. The keyer is of the type adapted to operate on component video signals. Upon detection of the key color signal from the foreground video source, color detector 14 generates a key signal on an output line 20 which is delivered to the keyer 16. This causes the keyer 16 to switch from the foreground video signal source 12 to the background video source 18. The red, green and blue video output signals from the keyer 16 enter an encoder 22 which converts them to composite video form. The composite video signals are caused to create a video picture on a monitor 28. If the signal from the encoder 22 is broadcast, the unit 28 is a receiver in a television viewer's home.

Figure 2:
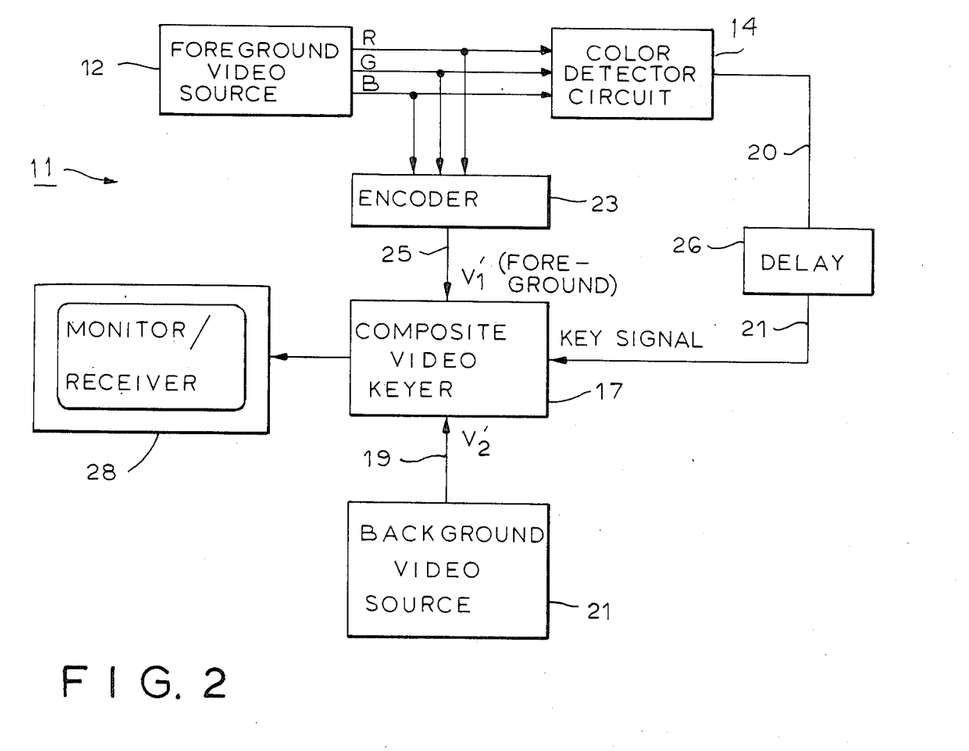
FIG. 2 is a schematic circuit diagram of an alternative embodiment of the invention.

An alternate embodiment of the invention is shown in FIG. 2. In FIG. 2, the chroma key system 11 has a keyer 17 which is of the type adapted to operate with composite video signals. Therefore, an encoder 23 is connected between the output of the source 12 and the keyer 17 to convert the component signals to composite form. Also, a delay circuit 26 is connected in the line 20 delivering the key signal from the detector 14 to the keyer 17 in order to compensate for the time delay created by the encoder 23. Also, the background video source 21 is of the type delivering composite video signals. The output of the keyer 17 is a composite video signal which is delivered to the video output monitor or receiver 28, as described above. The color detector circuit is described in greater detail in FIGS. 3 and 4.

COLOR DETECTOR CIRCUIT

Figure 4A:
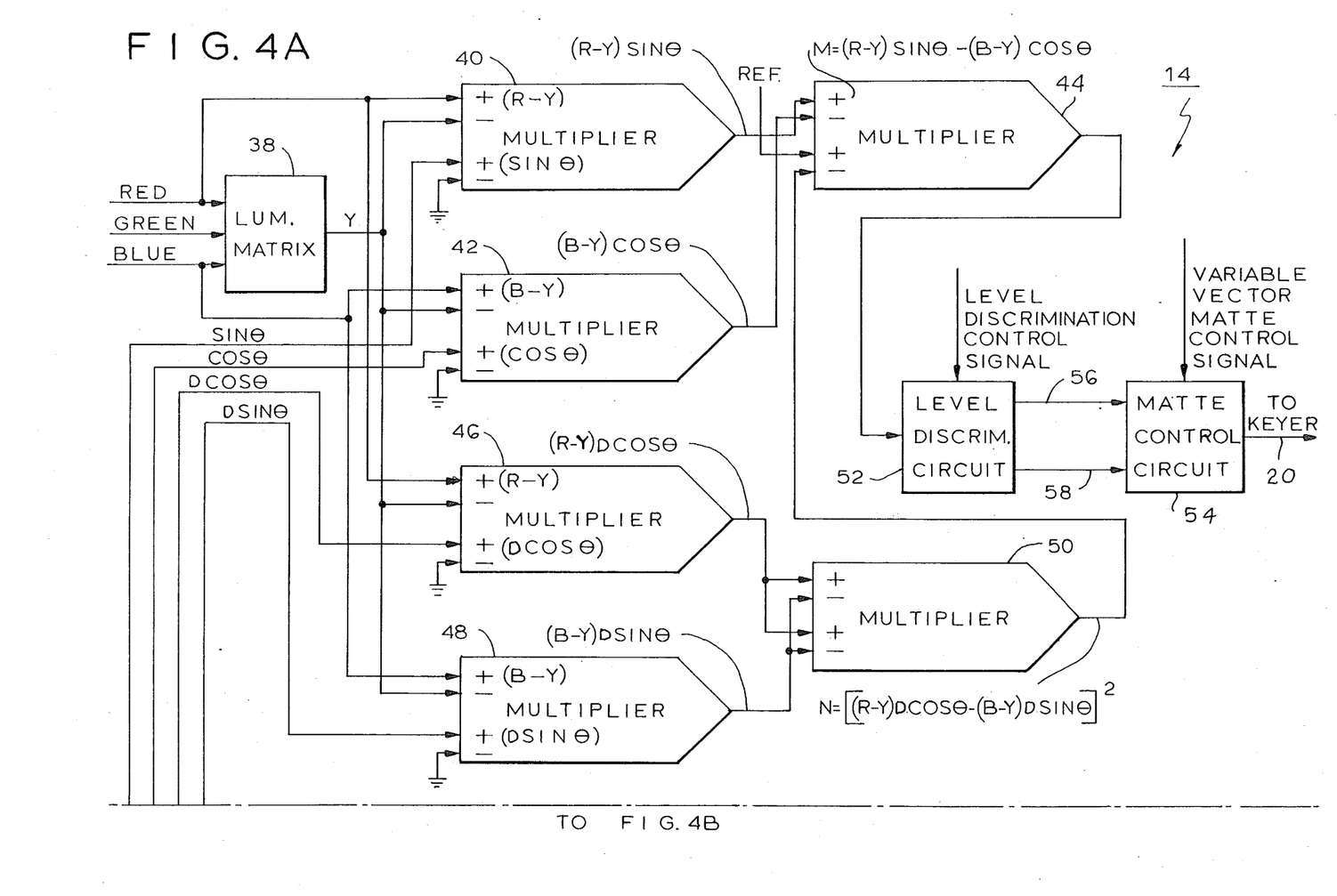
FIG. 4A and 4B are more detailed schematic circuit diagram of the device shown in FIG. 1.
Figure 4B:
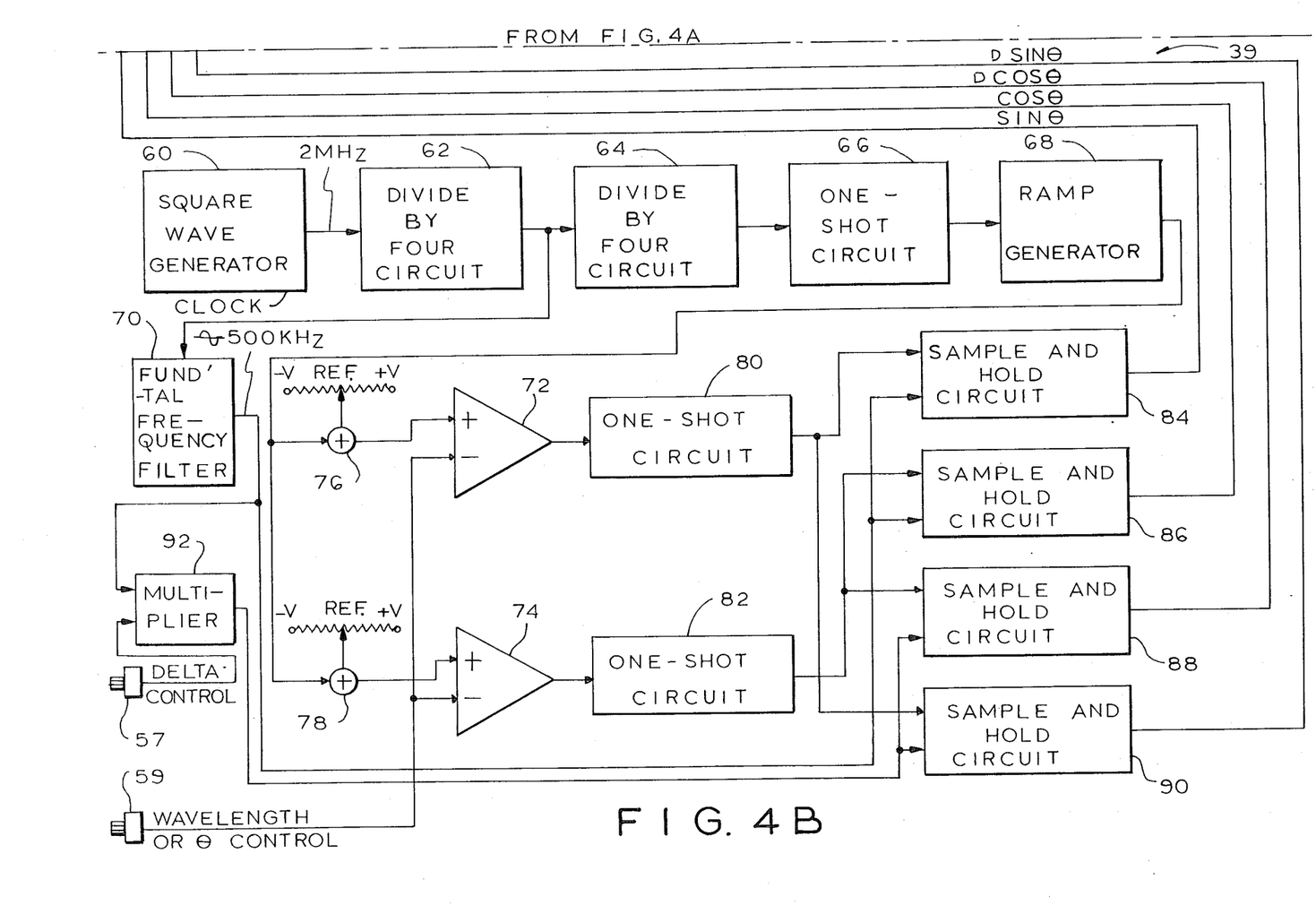

FIG. 4 is a schematic diagram of the color detector circuit 14 used in the chroma key devices of FIGS. 1 and 2. Red ("R"), green ("G"), and blue ("B") signals from the foreground video signal source enter a standard luminance matrix 38 which produces a luminance signal ("Y") at its output. A coefficient processor circuit 39 (in the lower part of FIG. 4) generates four d.c. signals proportional to $\sin \theta$, $\cos \theta$, $D \cos \theta$ and $D \sin \theta$, respectively. These signals are supplied as inputs to four-quadrant multiplier circuits 40, 42, 46, and 48.

The red signal R and the luminance signal Y are delivered, respectively, to the (+) and (−) input terminals of the first four-quadrant multiplier circuit 40, thus forming (R-Y) as one input signal to the multiplier.

Figure 3:
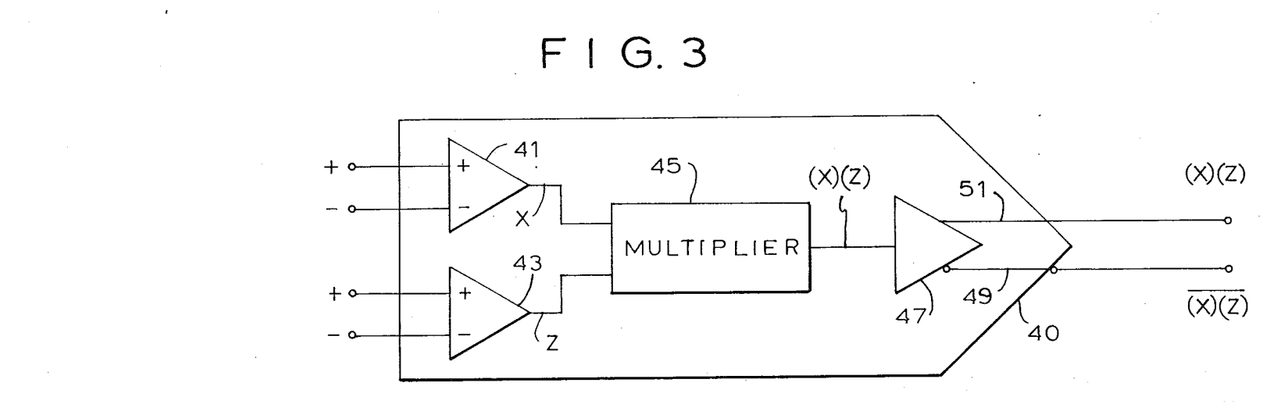
FIG. 3 is a schematic circuit diagram of a component of the device shown in FIG. 1.

FIG. 3 is an enlarged and more detailed view of the multiplier circuit 40. The circuit 40 is an integrated circuit including a pair of differential amplifiers 41 and 43 which deliver their outputs to an analog multiplier circuit 45, which delivers to an amplifier 47 a signal proportional to the product of its two input signals X and Z. Amplifier 47 delivers an amplified signal proportional to the product $(X)(Z)$ on one output line 51, and an inverted signal $\overline{(X)(Z)}$ on line 49.

One satisfactory integrated circuit chip for this use is the MC1595L multiplier sold by Motorola, Inc.

Thus, the input signal (R-Y) is formed by the differential amplifier 41 which has (R) applied to its (+) input terminal and (Y) to its (−) terminal.

Each multiplier circuit shown in the upper portion of FIG. 4; that is, each of the multipliers 42, 44, 46, 48 and 50, has the same structure as the multiplier 40 shown in FIG. 3.

In a similar manner, a (B-Y) signal is formed as one input to the four-quadrant multiplier circuit 42. As it is shown in FIG. 7, the (R-Y) and (B-Y) signals are defined to be in quadrature. The vector "S" of FIG. 7 is the resultant of the (R-Y) and (B-Y) vectors. The angle $\theta$ formed by the vector "S" is the measure of the hue of the video signals.

The angle $\theta$ corresponding to the hue to be detected by the detector 14 can be selected at any angle from 0° to 360°. This is accomplished, in effect, by the use of a variable, selectable passband filter circuit which filters out all signals other than those within a certain passband around the selected hue corresponding to the angle $\theta$. Thus, the signal ($\sin \theta$) is supplied as a second input to the multiplier 40, and the signal ($\cos \theta$) as a second input to the multiplier 42. The output of multiplier 40 is proportional to (R-Y) $\sin \theta$, and that from multiplier 42 is proportional to (B-Y) $\cos \theta$.

The output from multiplier 40 is delivered to the (+) input terminal of another multiplier 44 so as to form the input signal (R-Y) $\sin \theta$ − (B-Y) $\cos \theta$. A level discriminator 52 produces a "key" output signal only when the output of the multiplier 44 is either above a first pre-set level or below a second pre-set level.

Although the resultant color vector to be detected effectively can be rotated through an angle of 360° or more by varying $\theta$, the operation of the circuit described so far as a color discriminator is unsatisfactory because the range of hues it recognizes or "keys" on is so broad that it tends to recognize colors substantially different from the matte color.

The latter problem is illustrated in FIG. 9 in which the curve 212 expresses the relationship between hue and the output of the multiplier circuit 44 due solely to the input signals described so far; that is, without consideration of the signals applied to the lower pair of terminals of the multiplier circuit 44. The curve 212 is relatively broad and crosses the zero-axis at two points, one of which leads $\theta$ by 90°, and one of which lags $\theta$ by 90°; that is, the curve 212 covers an area spanning 180° of the color spectrum. A second curve is shown at 216.

This curve results from a shift of the angle θ to a new value θ'.

In the prior art, a level detector circuit is used to discriminate against all signals lower in magnitude than a pre-set level 214. By this means, the range of hues detected by the circuit is narrowed to the area between points A and B where the level detector level 214 crosses the curve 212, without affecting the passband of the detector circuit itself. Because the shape of the curve 212 remains very broad, usually the range of hues between points A and B also is relatively broad. Furthermore, the shape of the curve 212 makes the detector circuit largely dependent on saturation levels rather than hue.

In accordance with a valuable feature of the invention, the passband of the hue selector circuit itself is narrowed by the use of three four-quadrant multiplier circuit devices 46, 48 and 50, together with the multiplier 44.

With this feature, the passband can be made as narrow as 2° and as broad as 90° on either side of the center, or principal color, substantially independently of the saturation of the input signals.

Multiplier 46 develops a signal of (R-Y) on its upper terminals. A signal (D cos θ) is developed on its lower terminals from a delta control signal source 39 which multiplies the cos θ signal by a "delta" factor "D".

Similarly, (B-Y) and (D sin θ) signals are developed at the input terminals of the multiplier 48.

The outputs from multipliers 46 and 48 are subtracted from one another by the input differential amplifiers in a multiplier circuit 50 which is used as a squarer. Thus, the quantity (R-Y) D cos θ−(B-Y) D sin θ is formed at the output of each input differential amplifier. Those outputs are multiplied by one another to square that quantity and produce a signal N:

$$N = [(R\text{-}Y)D \cos \theta - (B\text{-}Y) D \sin \theta]^2,$$

at the output of the squarer 50.

This signal is sent to the lower negative input terminal of multiplier 44 where it is subtracted from a reference signal "REF." The resulting signal (1−N) is multiplied with M=(R-Y) sin θ−(B-Y) cos θ and that product is sent to the level discriminator circuit 52.

The effects of this signal processing are shown in FIGS. 6A–6D, which are diagrams illustrating the operation of the circuitry. The angle θ or hue is plotted horizontally against the d.c. output voltage in response to the successive receipt of numerous signals of equal magnitude but whose hues vary throughout the visible spectrum, when a specific center hue θ has been selected for the pass-band of the circuit.

Figure 6A:
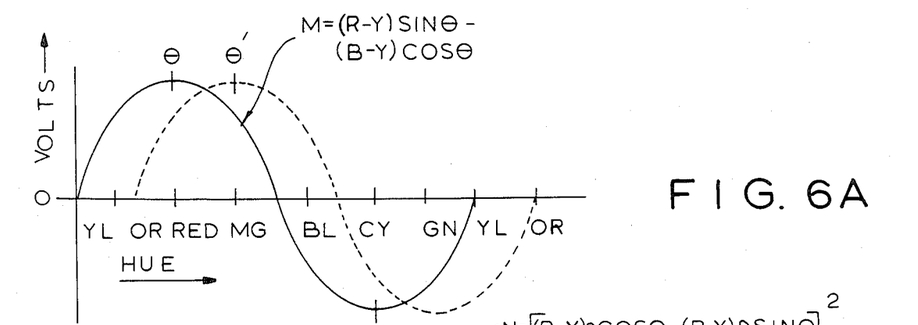
FIGS. 6A–6D are waveform diagrams illustrating the principles of operation of the circuit of FIG. 4.

FIG. 6A shows the variation of the signal M=(R-Y) sin θ−(B-Y) cos θ which is developed at one input to the multiplier 44. It is a sine wave whose period represents 360° of the color vector circle, with the selected hue located at θ, the positive peak of the sine wave.

Figure 6B:
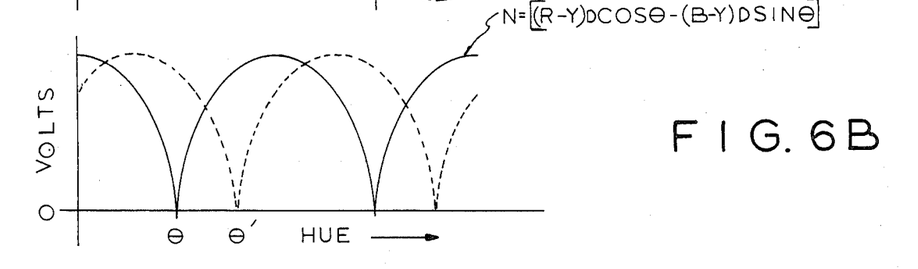

FIG. 6B shows the output of the squarer 50. It is 90° out of phase with the wave shown in FIG. 6A. The purpose of squaring the wave input to the squarer 50 is to make all peaks of the wave positive. FIG. 6B basically is made up of positive sine loops.

Figure 6C:
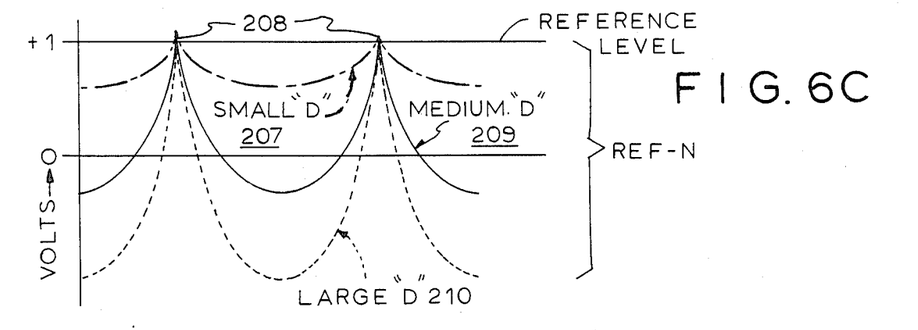

FIG. 6C shows the result of subtracting the signal N shown in FIG. 6B from the reference signal. The reference signal is a D.C. level which preferably is selected to produce a multiplication of one when N=0. The wave form in FIG. 6C has positive-going spikes 208 formed by the cusps between the inverted sine loops formed by the subtraction process.

The effects on the wave forms of a large delta factor "D", and medium and small delta factors are indicated, respectively, by dashed-line curve 210, solid curve 209, and dashed-line curve 207 in FIG. 6C.

Figure 6D:
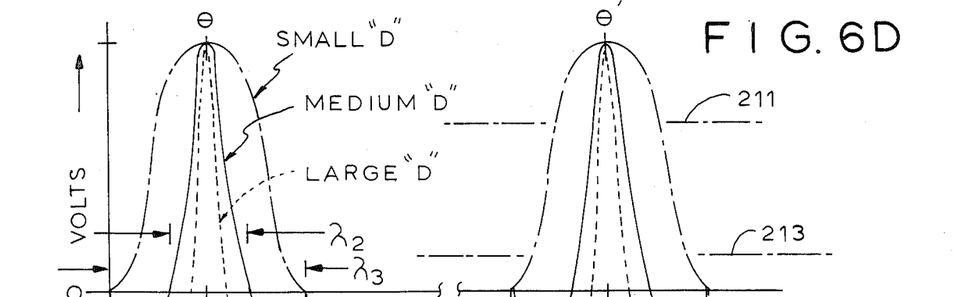

The wave form resulting from multiplying signal M (FIG. 6A) by the signal shown in FIG. 6C is shown in solid lines in FIG. 6D. The negative-going portion of the wave form between the first and third half-cycles is eliminated by a negative signal clipper in the level discriminator circuit 52, so that only positive peaks remain.

The wave forms in FIG. 6D also express the transmission characteristics for input signals of variable hue. That is, signals having a phase angle equal to θ, the selected phase angle defining the desired hue, are transmitted with maximum values; other signals are attenuated to a degree depending upon the shape of the transmission curve, which depends on the delta "D" factor, and the number of degrees that the signal is distant from θ.

It can be seen in FIG. 6D that, as the delta factor "D" is increased, the passband λ of the circuit decreases. With a large "D" factor, the passband λ is relatively small. θ is the center frequency or hue of all of the passbands. The passband $\lambda_2$ formed by the use of a medium "D" factor is wider, thus providing for the detection of a wider range of hues around the center hue at θ. Finally, the passband formed by a small "D" factor is very wide, almost 180°.

FIGS. 6A, 6B and 6D show the waveforms resulting from a change of the selected hue from θ to θ'. The waveform for θ' has been omitted from FIG. 6C to avoid cluttering the drawing, and the waveform for θ' in FIG. 6D has been separated from the waveform for θ0 more than it actually would be, for the sake of clarity in the drawings.

It can be seen that the change of the selected hue from θ to θ' merely shifts the waveforms to the right in FIGS. 6A–6D. This changes the selected hue from near red to a hue around magenta. If the knob 59 is turned in the opposite direction by the same amount as it was turned to created the change from θ to θ', shifting the vector "S" counterclockwise from the reference burst axis, then the waveforms shift to the left by a corresponding amount to select a color between green and cyan. The angle θ can be changed in very small steps or increments, thus making the hue selection essentially infinitely variable.

The amplitude of the signal transmitted to the level discrimination circuit 52 is proportional to the saturation of the color being detected. The level discriminator circuit 52 is capable of rejecting all signals whose saturation falls either above or below a preset level such as levels 211 and 213 shown in the right-hand portion of FIG. 6D. The details of the circuit 52 are shown in the above-identified patent application Ser. No. 851,164. However, the discrimination levels are adjustable at will. The signals are delivered over one of two output leads 56 and 58, depending on whether a low or high saturation signal has been detected.

By setting the discriminator to pass only those signals whose saturation is below a certain level, the device 14 detects and differentiates low-saturation signals from high-saturation signals of the same hue.

Quite significantly, low saturation colors can be used as matte colors without any significant degradation of selectivity in color detection. If preferred for a particular job, high-saturation colors also can be used as matte colors, and the saturation selection process avoids the possibility of developing a key signal in response to the detection of a signal of the same hue but lower saturation.

By permitting the passband to thus be variable in both phase angle and width, the chroma keyer using the color detector circuit 14 can be adjusted to select virtually any hue, any one of a number of different saturation levels, and a passband width so as to adjust the keyer to compensate for varying matte colors, lighting, etc., and to eliminate or alleviate many of the problems mentioned above with prior chroma key devices.

The signals output on lines 56 and 58 pass through a matte control circuit 54. The output signal from that circuit is delivered on line 20 to the keyer, as it is shown in FIGS. 1 and 2.

WAVELENGTH AND PASSBAND SELECTION CONTROLS

The user of the chroma key device of the invention can select essentially any hue in the visible light spectrum to detect by operation of a wavelength or variable vector position control unit 59 (see lower left-hand portion of FIG. 4). Similarly, the delta or "D" factor determining the passband of the circuit is controlled by a control unit 57.

Units 57 and 59 can be simple potentiometers delivering a variable D.C. output signal to the coefficient processor circuit 39, or they can be digital shaft position encoders with digital-to-analog converters for delivering the same kind of signal.

The coefficient processor circuit 39 generates the sin 0, cos $\theta$, D cos $\theta$, and D sin $\theta$ signals which are supplied to multipliers 40, 42, 46, and 48 respectively.

The coefficient processor circuit 39 includes a square wave generator 60, which produces a 2-MHz square wave signal. The 2-MHz signal from the square wave generator 60 is sent to a divide-by-four circuit 62. The output of the divide-by-four circuit 62 is sent to another divide-by-four circuit 64 and to a fundamental frequency filter 70. The output signal from the divide-by-four circuit 64 is delivered to a one-shot circuit 66, which triggers a ramp generator 68. The output signal from the fundamental frequency filter 70 is a 500-KHz sine wave, while the output signal from the ramp generator 68 is a ramp which extends for four cycles of the 500-KHz sine wave.

In order to develop the sin $\theta$ and cos $\theta$ signals, the variable vector position control signal is compared to two different reference signals by one of two comparator circuits 72 and 74. The "plus" inputs of the comparators 72 and 74 are supplied by the summation circuits 76 and 78, respectively, and the wavelength or variable vector position control signal is applied to the "minus" inputs of the comparators. The summation circuit 76 adds the ramp signal to a reference signal, while the summation circuit 78 adds the ramp signal to a different reference signal. Each comparator detects equality between its input signals when the sum of the ramp signal plus the reference signal equals the wavelength control signal. The two different reference signals are selected to produce a difference of time equal to 90 degrees with respect to the 500-KHz sine wave. Accordingly, the output signals from the comparators 72 and 74 change from positive to negative at points 90 degrees apart along the sine wave produced by the fundamental frequency filter 70.

The output signals from the comparators 72 and 74 trigger one-shot circuits 80 and 82, respectively. The one-shot circuits 80 and 82, in turn, trigger sample-and-hold circuits 84 and 86, respectively. The sample-and-hold circuits 84 and 86 sample the 500-KHz sine wave from the fundamental frequency filter 70. Because the reference signals at the summation circuits 76 and 78 are set to correspond to a 90 degree phase difference, the sample-and-hold circuits 84 and 86 sample the 500-KHz sine wave at points which are 90 degrees apart. As a result, the sample-and-hold circuits 84 and 86 produce d.c. output signals which correspond to a phase difference of 90 degrees, and these signals are referred to as sin $\theta$ and cos $\theta$, respectively.

The variable vector position control signal determines when the output of the comparators 72 and 74 change from positive to negative. Consequently, the variable position control signal determines the sin $\theta$ and cos $\theta$ signals, and thereby determines $\theta$, the phase angle of the color in the range of colors selected by the wavelength control 59.

Two additional sample-and-hold circuits 88 and 90 are provided. They operate similarly to the sample-and-hold circuits 84 and 86 in order to determine the d.c. signals D cos $\theta$ and D sin $\theta$. However, the sample-and-hold circuits 88 and 90 do not directly sample the 500-KHz sine wave from the output of the fundamental frequency filter 70. Rather, the sample-and-hold circuits 88 and 90 sample the output signal from a multiplier 92. One input of the multiplier 92 is the 500-KHz sine wave from the fundamental frequency filter 70, while the other input of the multiplier 92 is the delta or passband control signal from the delta control 57. Accordingly, the output signal from the multiplier 92 is a 500-KHz sine wave which has its amplitude modified by the delta control signal.

When the one-shot circuits 80 and 82 trigger the sample-and-hold circuits 84 and 86, the one-shot circuits 80 and 82 simultaneously trigger the sample-and-hold circuits 88 and 90. Thus, the sample-and-hold circuits 88 and 90 sample a 500-KHz sine wave whose amplitude has been modified by the delta control signal to produce the D cos $\theta$ and D sin $\theta$ signals, respectively. The delta control signal, therefore, determines the value D, which sets the passband width or the range of detectable colors around the center color at $\theta$.

The sin $\theta$ signal from the sample-and-hold circuit 84, the cos $\theta$ signal from the sample-and-hold circuit 86, and the D cos $\theta$ signal from the sample-and-hold circuit 88, and the D sin $\theta$ signal from the sample-and-hold circuit 90 are delivered to multipliers 40, 42, 46 and 48, respectively.

MATTE CONTROL CIRCUIT

The matte control circuit 54 is a circuit for forming in a picture a limited area or "window" within which or outside of which the colors can be detected by the color detector circuit 14. The window is movable and can be changed in size. This can be useful in eliminating a particularly troublesome area of foreground color from detection so as to prevent false keying. Also, the variable window can be used to limit the area of the inserted background signal.

The circuitry of the device 54 is described in detail in U.S. Pat. No. 4,679,067, issued on July 7, 1987, and that description is incorporated herein by reference.

If the chroma keyer device is used as a part of a scene-by-scene color corrector in a film-to-tape, tape-to-tape, or other such transfer system, the window can be programmed to move with objects changing position from one scene to the next, so as to produce a "traveling" window. The techniques for doing this are described in greater detail in our co-pending U.S. patent application Ser. No. 851,164 and will not be repeated herein.

KEYER

The keying device 16 or 17 shown in FIGS. 1 or 2 does not form a part of this invention. Any device capable of rapidly switching back and forth between the foreground and background sources in response to key signals from the color detector circuit 14 can be used as a keyer, as long as it is capable of operating with, or can be modified to operate with, either composite or component video signals, as required.

Figure 5:
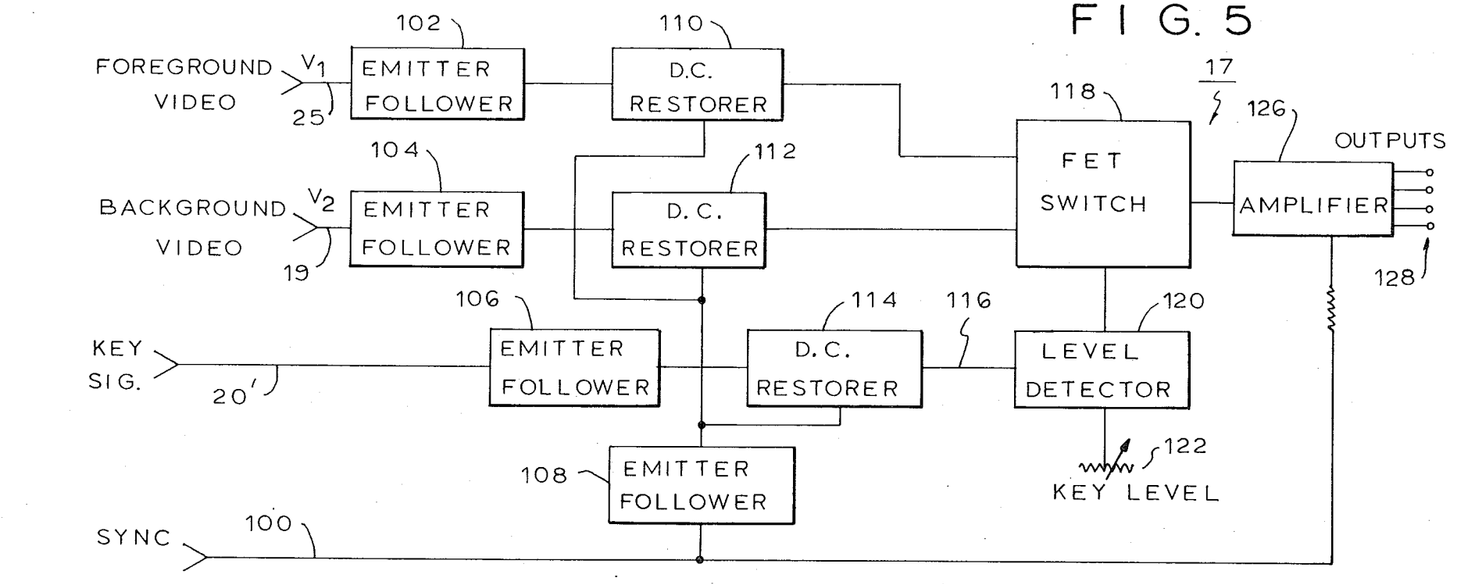
FIG. 5 is a schematic circuit diagram of the keyer which is part of the device shown in FIG. 1.

A very simple prior art keyer 17 which is suitable for use with composite video is the Grass Valley model 930 video insert keyer, whose schematic circuit diagram is shown in FIG. 5.

The keyer 17 of FIG. 5 has four input leads 19, 21, 25 and 100. Lines 19 and 25, which also are shown in FIG. 2, respectively receive the background and foreground signals; line 21 receives the key signal; and line 100 receives the video synch signal. Emitter-follower circuits 102, 104, 106 and 108 couple the signals from the four inputs to an FET switch 11 through D.C. restorer circuits 110, 112 and 114. The emitter-follower circuits are for impedance matching purposes, and the D.C. restorer circuits clamp the signals to a D.C. potential and, in essence, set a zero level for black signals.

The FET switch 118 is a very fast switch which rapidly switches between one condition in which the foreground source is connected to deliver output signals over the output leads 128, to the other in which the background source is so connected. The operation of the FET switch 118 is controlled by the key signal, which is delivered to the switch 118 through an optional level detector circuit 120 whose detection level is controlled by a potentiometer 122.

Of course, other, more sophisticated keyers also can be used—keyers which solve or alleviate other keying problems such as those caused by shadows, and which provide either "hard" or "soft" edges for the key areas. Typical of the more sophisticated keyers are those shown in Vlahos U.S. Pat. Nos. 4,100,569 and 4,589,012.

MULTIPLE KEYING

Figure 10:
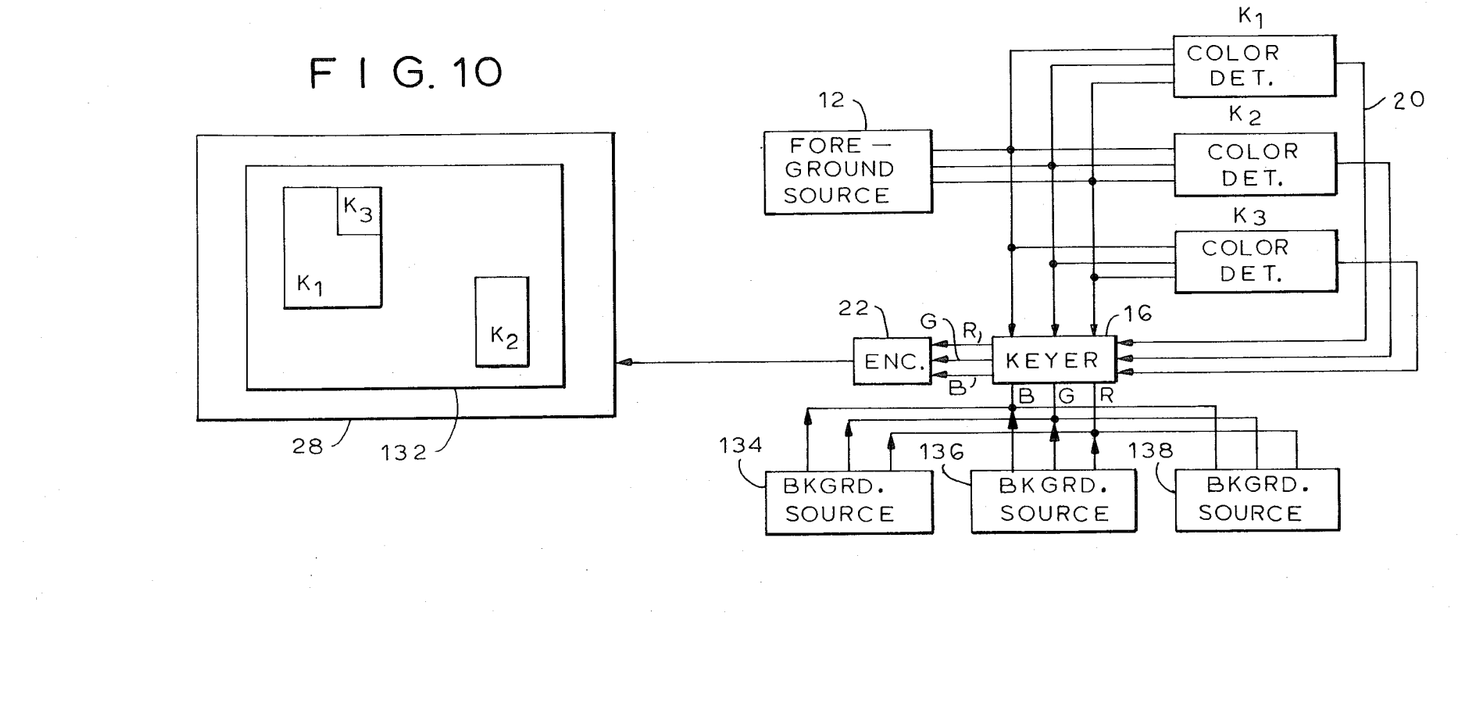
FIGS. 10 and 11 are schematic circuit diagrams of alternative embodiments of the invention.

FIG. 10 shows a chroma key system for providing multiple keys in a single picture frame. For example, three color detector circuits $K_1$, $K_2$ and $K_3$, each having the construction shown in FIG. 4, are used to detect three different matte colors $K_1$, $K_2$ and $K_3$ appearing on the monitor picture 132. These three matte colors are used to insert one of three different background signals from one of three sources 134, 136 and 138 in each area $K_1$, $K_2$ and $K_3$. The keyer 16 is specially adapted to switch between the foreground and any of the three background sources in response to key signals from the color detector circuits $K_1$, $K_2$ and $K_3$.

Advantageously, each of the three key colors can be similar to the others, so that standard detectors can be used to detect several similar matte colors in a single frame to provide multiple keys.

It is believed to be possible to program a computer to switch automatically between two or more different color detector circuit settings for one frame in a system using only one color detector, thus avoiding the use of two or more color detector circuits. The different settings could be stored in a first run through a recorded image source such as motion picture film or videotape, with the different settings being read out and applied to the color detector during a second run for recording a videotape or other record. The computer advantageously can be one used in a color correction system, as it will be described below.

USE IN COLOR CORRECTION

When the insertion of background signals is to be done during editing or color correction of motion picture film or videotape, the matte color appears in the background, and a chroma key device can be used to detect the color and replace it with background source signals in making the final videotape for broadcast.

In the past, the matte color itself in the film or tape sometimes had to be corrected before the chroma key device would work properly. It is believed that the chroma key device of the invention will reduce or eliminate the need for such color correction because it can be adjusted and fine tuned to key in the color despite its deviations from the desired hue and saturation levels.

Figure 11:
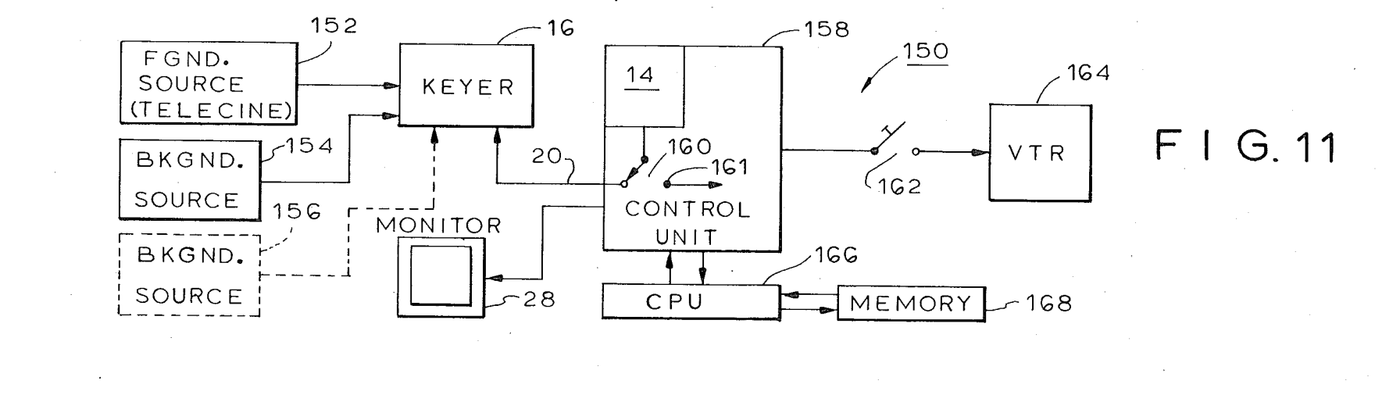

FIG. 11 of the drawings shows a color correction system 150 including a foreground source 152 such as a telecine, and two background sources 154 and 156. The output of a selected one of the sources 152 (a telecine), 154 and 156 is delivered through the keyer 16 to the color correction control unit 158, which includes all the controls and circuits necessary for color correction. The resulting picture is displayed on the monitor 28. The CPU and RAM memory of the color correction computer of the system are shown at 166 and 168, respectively. As it is well known, the CPU and memory cooperate to store scene location information and color correction values for each scene of the film being run on the telecine.

During normal color correction, the output of the color detector circuit 14 which forms a part of the control unit 158 is switched to a terminal 161 which allows it to perform its normal function—to select specific colors to correct. Then, when operation as a chroma key device is desired, the switch 160 is operated to connect the output of circuit 14 to the line 20 to deliver key signals to the keyer 16. Thus, the same color detector circuit 14 is used for two functions. This reduces the cost and size of the color correction system 150.

Of course, if preferred, a separate color detector circuit 14 can be provided solely for use in the chroma key device.

During color correction of each scene in which the chroma key device is to be used, the wavelength control, delta control, and saturation level control knobs are operated to adjust those parameters for the scene. Then, when the adjustments are complete, signals corresponding to the adjustments are stored in the memory 168 of the computer, in association with the scene location data. As the settings of the wavelength, etc. knobs are changed for different scenes, the new values are also stored. If color corrections are made, they also are stored in the same way.

Both the chroma key and color correction values stored for a prior scene or frame can be recalled from the RAM memory 168, applied to and used for the current scene or frame, either with or without modifications. Recall can be done by use of a keypad to call up the prior scene or frame number, or by the use of other techniques discussed in the co-pending application Ser. No. 851,164.

After the foregoing parameters have been set and stored, the film is rewound, and a switch 162 enabling a videotape recorder 164 is closed, the telecine is re-started, and the film is transferred to videotape. As each scene-change signal is read out of memory, the settings for the controls of the chroma key device, as well as the color correction values, are read out of memory. The stored chroma key settings are used to set the wavelength and delta controls to the desired value to insert signals from one or more of the background sources 154, 156 in place of the matte color signals.

Although particular illustrative embodiments of the present invention have been described herein with reference to the accompanying drawings, the present invention is not limited to these particular embodiments.

For example, the coefficient processor circuit 39 has analog signal processing circuits. However, suitably programmed general purpose computer or microprocessor may be employed in lieu of the analog signal processing circuits. In addition, digital circuits may be used for other components in the variable vector control circuits as well. Various other changes and modifications may be made thereto by those skilled in the art without departing from the spirit of scope of the invention.

We claim:

1. A video color detector device comprising detecting means for detecting the color phase angle representing the hue of color information-bearing video signals, said detecting means including filter means for transmitting only those video signals having a phase angle within a predetermined passband relative to a variable predetermined phase angle, hue selection means for pre-selecting said predetermined phase angle, and passband width control means for varying the width of said passband independently of the saturation of the transmitted signals.

2. A device as in claim 1 including level detector means connected to the output of said filter means to discriminate against output signal levels other than those falling within a predetermined range.

3. A device as in claim 2 in which the magnitude of said video signals is representative of the saturation of the color, and said level detector is adapted to discriminate against signals whose saturation is greater than a predetermined level.

4. A video color detector device comprising detecting means for detecting the color phase angle representing the hue of color information-bearing video signals, said detecting means including filter means for transmitting only those video signals having a phase angle within a predetermined passband relative to a variable predetermined phase angle, hue selection means for pre-selecting said predetermined phase angle, and passband width control means for varying the width of said passband independently of the saturation of the transmitted signals, said device including means for creating at least one barrier to form a window of variable position in a video picture formed from said signals and for disabling said detector when detecting video signals on one side of the barrier forming said window.

5. A device as in claim 4 including means for varying the size of said window.

6. A video color detector device comprising detecting means for detecting the color phase angle representing the hue of color information-bearing video signals, said detecting means including filter means for transmitting only those video signals having a phase angle within a predetermined passband relative to a variable predetermined phase angle, hue selection means for pre-selecting said predetermined phase angle, and passband width control means for varying the width of said passband independently of the saturation of the transmitted signals, in which said video signals include red (R), green (G), and blue (B) component signals, and a luminance (Y) signal, means for forming the signals (R-Y) and (B-Y), and means for modulating said R-Y signal with a signal corresponding to sine $\theta$ and modulating said (B-Y) signal with a signal corresponding to cos $\theta$, where $\theta$ is said predetermined phase angle, subtracting the latter modulation product from the former modulation product, forming signals proportional to $D(R-Y) \cos \theta$ and $D(B-Y) \sin \theta$, where D is a bandwidth factor, adding the latter signals together and rectifying the result, subtracting the result of the rectifying operation from a reference signal and multiplying that result times the result of subtracting the two modulation products from one another, said passband width control means comprising means for varying the value of D.

7. A device as in claim 6 in which said hue selector means comprises means for pre-selecting the angle $\theta$.

8. A video color detector device comprising detecting means for detecting the color phase angle representing the hue of color information-bearing video signals, said detecting means including electrical circuit means for transmitting only those video signals having phase angles within a relatively narrow passband but having a substantially full range of saturation values.

9. A device as in claim 8 in which a curve representing the variation of the magnitude of the transmitted signals with hue has a substantially spike form.

10. A device as in claim 8 including passband control means for varying the width of said passband independently of saturation values and thereby varying the range of hue detected.

11. A device as in claim 10 including hue selector means for varying the relative position of said passband around a color vector circle to select the predominant hue to be detected.

12. A device as in claim 8 including level detector means connected to the output of said electrical circuit means to discriminate against signals whose saturation is above a predetermined level.

13. A video color detector device comprising detecting means for detecting the color phase angle representing the hue of color information-bearing video signals, said detecting means including electrical circuit means for transmitting only those video signals having phase angles within a relatively narrow passband but having a substantially full range of saturation values, said device including means for creating at least one barrier to form a window of variable position in a video picture formed from said signals and for disabling said detector when detecting video signals on one side of the barrier forming said window.

14. A chroma key device, said device comprising a video color detector for producing a color detection signal, said detector including detecting means for detecting the color phase angle representing the hue of color information-bearing video signals, said detecting means including electrical circuit means for transmitting only those video signals having phase angles within a relatively narrow passband but having a substantially full range of saturation values, and switching means for switching an output circuit from a first video signal source to a second video signal source in response to said color detection signal.

15. A device as in claim 14 passband control means for varying the width of said passband independently of saturation values and thereby varying the range of hues detected.

16. A device as in claim 15 including hue selector means for varying the relative position of said passband around said color vector circle to select the predominant hue to be detected.

17. A device as in claim 14 including level detector means connected to the output of said electrical circuit means to discriminate against signals whose saturation is above a predetermined level.

18. A device as in claim 17 including means for discriminating against signals whose saturation is below a second predetermined level.

19. A chroma key device comprising a video color detector for producing a color detection signal, said detector including detecting means for detecting the color phase angle representing the hue of color information-bearing video signals, said detecting means including electrical circuit means for transmitting only those video signals having phase angles within a relatively narrow passband but having a substantially full range of saturation values, switching means for switching an output circuit from a first video signal source to a second video signal source in response to said color detection signal, and passband control means for varying the width of said passband independently of saturation values and thereby varying the range of hues detected; said device including hue selector means for varying the relative position of said passband around said color vector circle to select the predominant hue to be detected; said device further including a plurality of said color detectors, each being capable of being set to detect a different predetermined hue, said switching means being adapted to respond separately to each color detection signal to switch from one to another of a plurality of video signal sources, whereby multiple key areas can be formed in a single video picture.

20. A chroma key device, said device comprising a video color detector for producing a color detection signal, said detector including detecting means for detecting the color phase angle representing the hue of color information-bearing video signals, said detecting means including filter means for transmitting only those video signals having a phase angle within a predetermined passband relative to a variable predetermined phase angle, hue selection means for pre-selecting said predetermined phase angle, and passband width control means for varying the width of said passband independently of the saturation of the transmitted signals, and switching means for switching an output circuit from a first video signal source to a second video signal source in response to said color detection signal.

21. A device as in claim 20 including level detector means connected to the output of said filter means to discriminate against output signal levels other than those falling within a predetermined range in which the magnitude of said video signals is representative of the saturation of the color, and said level detector is adapted to discriminate against signals whose saturation is above a predetermined level.

22. A chroma key device comprising a video color detector for producing a color detection signal, said detector including detecting means for detecting the color phase angle representing the hue of color information-bearing video signals, said detecting means including filter means for transmitting only those video signals having a phase angle within a predetermined passband relative to a variable predetermined phase angle, hue selection means for pre-selecting said predetermined phase angle, passband width control means for varying the width of said passband independently of the saturation of the transmitted signals, and switching means for switching an output circuit from a first video signal source to a second video signal source in response to said color detection signal, said device including means for creating at least one barrier to form a window of variable position in a video picture formed from said signals and for disabling said detector when detecting video signals on one side of the barrier forming said window.

23. A device as in claim 22 including means for varying the size of said window.

24. A chroma key device comprising a video color detector for producing a color detection signal, said detector including detecting means for detecting the color phase angle representing the hue of color information-bearing video signals, said detecting means including filter means for transmitting only those video signals having a phase angle within a predetermined passband relative to a variable predetermined phase angle, hue selection means for pre-selecting said predetermined phase angle, passband width control means for varying the width of said passband independently of the saturation of the transmitted signals, and switching means for switching the output circuit from a first video signal source to a second video signal source in response to said color detection signal, in which said video signals include red (R), green (G), and blue (B) component signals, and a luminance (Y) signal, means for forming the signals (R-Y) and (B-Y), and means for modulating said R-Y signal with a signal corresponding to sine $\theta$ and modulating said (B-Y) signal with a signal corresponding to cos $\theta$, where $\theta$ is said predetermined phase angle, subtracting the latter modulation product from the former modulation product, forming signals proportional to D(R-Y) cos $\theta$ and D(B-Y) sine $\theta$, where D is a bandwidth factor, adding the latter signals together and rectifying the result, subtracting the result of the rectifying operation from a reference signal and multiplying that result times the result of subtracting the two modulation products from one another, said passband width control means comprising means for varying the value of D.

25. A device as in claim 24 in which said hue selector means comprises means for pre-selecting the angle $\theta$.

26. Apparatus for switching video signals at an output terminal by switching between a first video signal source producing first video signals and a second video signal source producing second video signals, comprising: detecting means for detecting the ones of said first video signals which are within a predetermined range of colors adjacent a variable principal color; first control means for varying said principal color; switching means responsive to said detecting means for switching said output terminal from said first video signal source to said second video signal source when the detected ones of said first video signals are within said predetermined color range; said first video signal source being adapted to reproduce video signals stored on an image storage medium in frames, means for developing frame identification signals for said frames, memory means, means for storing said frame identification signals in said memory means, means for storing data corresponding to the setting of said first control means in said memory for each frame for which it is to be used, and means responsive to said frame identification signals for reading said data out of said memory and applying said data to control the settings of said first control means during reproduction of the images of the corresponding frame.

27. Apparatus as in claim 26 and including second control means for narrowing or widening the response characteristic curve of said detecting means to narrow or widen said range, means for storing data corresponding to the settings of said second control means and means responsive to said frame identification signals for retrieving the latter data and applying it to control the settings of said second control means during reproduction of the images of the corresponding frame.

28. Apparatus as in claim 26 including means for making color corrections for signals from said first source, storing data corresponding to said corrections in said memory, and means responsive to said frame identification signals for retrieving the latter data and applying it to control signals representing the colors of the reproduced images during reproduction of the images of the corresponding frame.

29. Apparatus as in claim 26 including means for adapting said detecting means to operate selectively to perform in color correction or to perform in switching between video sources, and for storing color correction data and/or chroma key control settings data.

30. Apparatus as in claim 26 including level detector means connected to the output of said detecting means to discriminate against output signal levels other than those falling within a predetermined range.

31. Apparatus as in claim 26 including means for creating at least one barrier to form a window of variable position in a video picture formed from said signals and for disabling said detector when detecting video signals on one side of the barriers forming said window.

32. Apparatus as in claim 26 in which said memory means is random access memory means with means for recalling data stored for prior scenes by retrieval based on use of the frame identification information, applying the recalled data to images in a frame currently being analyzed, and modifying the recalled data to the extent necessary to adapt it for use with the current frame.

33. A method of switching video signals at an output terminal by switching between a first video signal source producing first video signals and a second video signal source producing second video signals, said method comprising the steps of:
providing detecting means for detecting signals within a predetermined range of colors;
setting a variable principal color;
narrowing or widening the response characteristic curve of said detecting means, while maintaining a substantially full range of saturation values, to narrow or widen the range of detectable colors adjacent said principal color;
detecting the ones of said first video signals which are within said range of colors adjacent said variable principal color; and
providing switching means responsive to said detecting means for switching said output terminal from said first video signal source to said second video signal source when the detected ones of said first video signals are within said color range.

34. A method as in claim 33 in which said setting step comprises operating a substantially infinitely variable control means for varying said principal color.

35. A method as in claim 33 including the step of limiting the response of said switching means to those signals from said detecting means which are below a predetermined range.

36. A method as in claim 33 including the step of providing a plurality of color detecting means and setting each to detect a different color and to cause switching between different video sources when the corresponding colors are detected.

37. A method of switching video signals at an output terminal by switching between a first video signal source producing first video signals and a second video signal source producing second video signals, said method comprising the steps of:
providing detecting means for detecting signals within a predetermined range of colors;
setting a variable principal color;
narrowing or widening the response characteristic curve of said detecting means to narrow or widen the range of detectable colors adjacent said principal color;
detecting the ones of said first video signals which are within said range of colors adjacent said variable principal color; and
providing switching means responsive to said detecting means for switching said output terminal from said first video signal source to said second video signal source when the detected ones of said first video signals are within said color range;
in which said first video source is a reproduction device for reproducing images stored on a storage medium in frames, said method further including the steps of:
providing memory means, means for developing frame identification signals for said frames, and means for storing said frame identification signals in said memory means;
storing data corresponding to the setting of said first control means in said memory for each frame for which it is to be used;
providing means responsive to said frame identification signals for storing in said memory means data corresponding to the control settings for said detecting means; and
causing the data to be read out under control of the frame identification signals and applied to said detecting means during reproduction of corresponding images.

38. A method as in claim 37 including forming a window in a video picture produced on a monitor from the video signals from said first source, sizing and positioning said window to encompass a desired object, and limiting the action of said detecting means to the area inside or outside of said window.

39. A method as in claim 38 including providing a computer and programming said computer to cause said window to move with the motion of an object it encompasses from one scene or frame to another.

40. A video color detector device comprising detecting means for detecting the color phase angle representing the hue of color information-bearing video signals, said detecting means including filter means for transmitting only those video signals having a phase angle within a predetermined passband relative to a variable predetermined phase angle, hue selection means for pre-selecting said predetermined phase angle, and passband width control means for varying the width of said passband independently of the saturation of the transmitted signals, in which said detecting means includes means for combining quadrature signals proportional to the sine and cosine of an angle corresponding to the color vector to be detected, and including sine wave voltage generator means, and means for sampling said sine wave voltage and storing signals proportional to the voltages of said sine wave at points in the wave separated by ninety degrees in phase to produce said quadrature signals.

41. A video color detector device comprising detecting means for detecting the color phase angle representing the hue of color information-bearing video signals, said detecting means including electrical circuit means for transmitting only those video signals having phase angles within a relatively narrow passband but having a substantially full range of saturation values, in which said detecting means includes means for combining quadrature signals proportional to the sine and cosine of an angle corresponding to the color vector to be detected, and including sine wave voltage generator means, and means for sampling said sine wave voltage and storing signals proportional to the voltages of said sine wave at points in the wave separated by ninety degrees in phase to produce said quadrature signals.

42. A chroma key device, said device comprising a video color detector for producing a color detection signal, said detector including detecting means for detecting the color phase angle representing the hue color information-bearing video signals, said detecting means including filter means for transmitting only those video signals having a phase angle within a predetermined passband relative to a variable predetermined phase angle, hue selection means for pre-selecting said predetermined phase angle, passband width control means for varying the width of said passband independently of the saturation of the transmitted signals, and switching means for switching an output circuit from a first video signal source to a second video signal source in response to said color detection signal, in which said detecting means includes means for combining quadrature signals proportional to the sine and cosine of an angle corresponding to the color vector to be detected, and including sine wave voltage generator means, and means for sampling said sine wave voltage and storing signals proportional to the voltages of said sine wave at points in the wave separated by ninety degrees in phase to produce said quadrature signals.

43. A device as in claim 40 or 41 or 42 including means for producing further signals proportional to the sine and cosine of said angle, each being multiplied by a band width factor D, and being combined with said quadrature signals to give said device a bandwidth proportional to D.

* * * * *